(12) United States Patent
Zhang et al.

(10) Patent No.: US 12,379,863 B2
(45) Date of Patent: Aug. 5, 2025

(54) OPTIMIZED FILE STORAGE STRATEGY FOR INCREASING USABILITY OF KEY FILES

(71) Applicant: DELL PRODUCTS L.P., Round Rock, TX (US)

(72) Inventors: Dong Zhang, Shanghai (CN); Yinghui Liu, Shanghai (CN); Wanqing Zheng, Shanghai (CN); Weiwei Jiang, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 114 days.

(21) Appl. No.: 18/464,781

(22) Filed: Sep. 11, 2023

(65) Prior Publication Data

US 2025/0060895 A1 Feb. 20, 2025

(30) Foreign Application Priority Data

Aug. 17, 2023 (CN) .......................... 202311040825.1

(51) Int. Cl.
G06F 11/00 (2006.01)
G06F 3/06 (2006.01)

(52) U.S. Cl.
CPC .......... *G06F 3/0644* (2013.01); *G06F 3/0619* (2013.01); *G06F 3/0679* (2013.01)

(58) Field of Classification Search
CPC ............. G06F 11/1435; G06F 11/1446; G06F 11/1448; G06F 11/1451; G06F 11/1456; G06F 11/1469; G06F 3/0619
See application file for complete search history.

(56) References Cited

U.S. PATENT DOCUMENTS

| | | | |
|---|---|---|---|
| 5,083,264 A * | 1/1992 | Platteter | G11B 20/1883 |
| 6,519,762 B1 * | 2/2003 | Colligan | G06F 21/80 |
| | | | 717/170 |
| 8,732,121 B1 * | 5/2014 | Zorin | G06F 11/1448 |
| | | | 707/640 |
| 11,650,887 B2 | 5/2023 | Samuel et al. | |
| 12,204,419 B1 * | 1/2025 | Yadav | G06F 11/1469 |
| 2005/0131968 A1 * | 6/2005 | Augenstein | G06F 11/1458 |
| 2013/0066838 A1 * | 3/2013 | Singla | G06F 11/1448 |
| | | | 707/674 |
| 2016/0170735 A1 * | 6/2016 | Kuo | H04L 67/34 |
| | | | 717/169 |
| 2018/0107558 A1 | 4/2018 | Rahardjo et al. | |
| 2021/0034466 A1 * | 2/2021 | Peros | G06F 11/0793 |
| 2021/0182157 A1 * | 6/2021 | Kwon | G06F 11/1448 |

\* cited by examiner

*Primary Examiner* — Philip Guyton
(74) *Attorney, Agent, or Firm* — Larson Newman, LLP

(57) ABSTRACT

An information handling system includes a storage and a processor. The storage stores a key file in a partition of the storage. The processor receives a request for the key file and determines whether the key file is located within the partition of the storage. In response to the key file not being within the partition of the storage, the processor retrieves metadata for the key file. The processor determines a physical location for the key file based on the metadata. Based on the physical location, the processor retrieves segments of the key file from the partition of the storage. The processor downloads segments of the key file from a backend server. The processor re-creates the key file based on the segments of the key file retrieved from the partition of the storage and on the segments of the key file downloaded from the backend server.

18 Claims, 3 Drawing Sheets

OPTIMIZED FILE STORAGE STRATEGY FOR INCREASING USABILITY OF KEY FILES

FIELD OF THE DISCLOSURE

The present disclosure generally relates to information handling systems, and more particularly relates to an optimized file storage strategy for increasing usability of key files.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a storage that may store a key file in a partition of the storage. A processor may receive a request for the key file and determine whether the key file is located within the partition of the storage. In response to the key file not being within the partition of the storage, the processor may retrieve metadata for the key file. The processor may determine a physical location for the key file based on the metadata. Based on the physical location, the processor may retrieve one or more segments of the key file from the partition of the storage. The processor may download one or more segments of the key file from a backend server. The processor may re-create the key file based on the segments of the key file retrieved from the partition of the storage and on the segments of the key file downloaded from the backend server.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
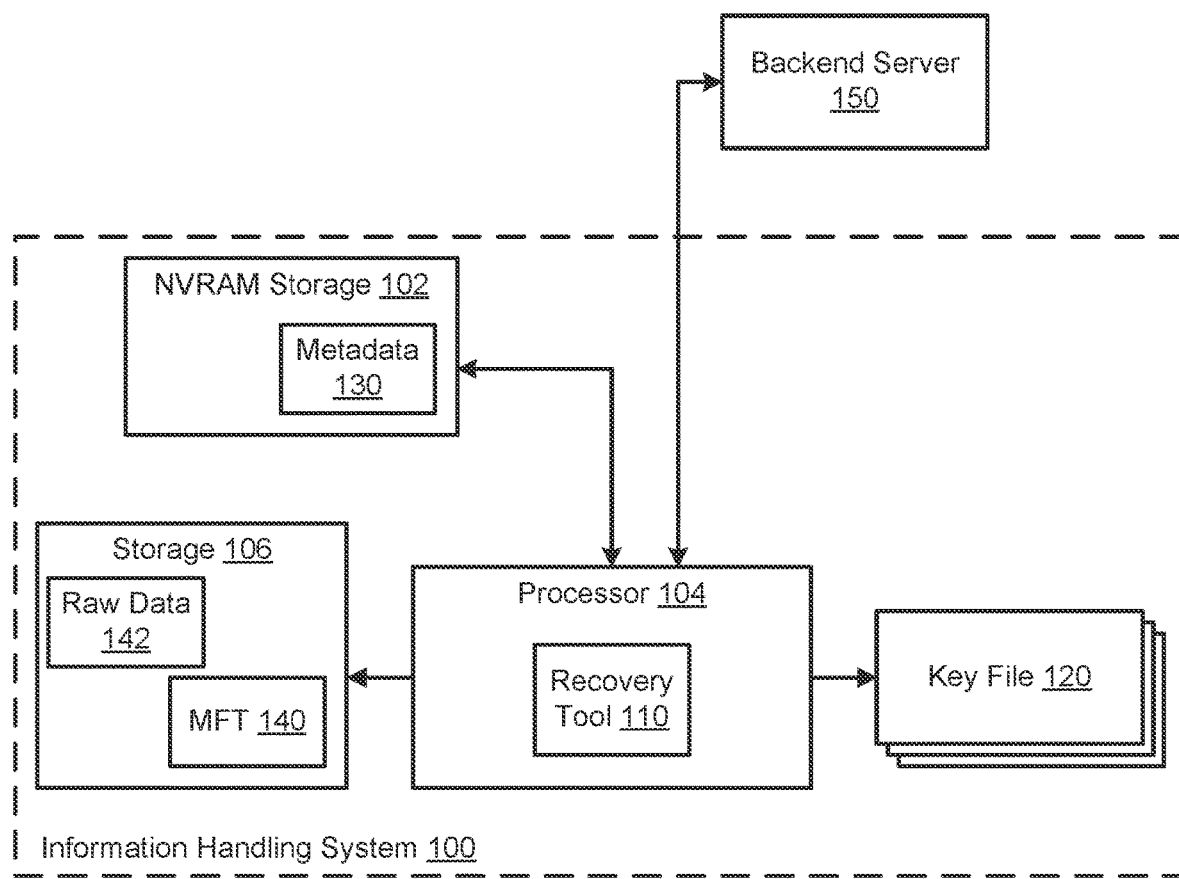
FIG. 1 is a block diagram of a portion of an information handling system according to at least one embodiment of the present disclosure.

FIG. 1 illustrates a portion of an information handling system 100 according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 100 includes a non-volatile random-access memory (NVRAM) 102, a processor 104, and a storage 106. Processor 104 may execute one or more sets of code including, but not limited to, a recovery code 110. Processor 104 may communicate with NVRAM storage 102 and storage 106 to recover a key file 120 as will be described herein. Information handling system 100 may include any suitable number of additional components or information handling systems without varying from the scope of this disclosure.

In an example, key files may be very important for system boot operations, system recovery operations, and hardware driver recovery operations. These key file may be installed during factory install operations. In certain examples, these key files may be deleted by individuals associated with an information handling system during actions including, but not limited to, formatting, and partition re-layout. The individuals may not be aware of what features were impacted by the deletion of these key files. When an individual wants to use related features, these features may not work because the key files are missing. Information handling system 100 may be improved by processor 104 storing metadata for key files 120 in NVRAM 102. Information handling system 100 may be further improved when metadata for large keys files is stored in NVRAM 102. Information handling system 100 may also be improved by processor 104 utilizing the persistent metadata to increase the usability of key files 120 via remaining raw data 142 in storage 106.

During operation of information handling system 100, processor 104 may save metadata 130 associated with one or more key files 120 in NVRAM storage 102. In an example, processor 104 may store metadata 130 in NVRAM storage 102 during an initial boot of information handling system 100, during a manufacturing process of the information handling system, or the like. As used herein, key file refers to a recovery image file for information handling system 100.

In an example, processor 104 may perform one or more suitable operations to store metadata 130 in NVRAM storage 102. For example, processor 104 may receive an entry in a master file table (MFT) 140, and the entry number may be identified by a value, such as $MFT. Based on the entry number, a file record with information associated with key file 120 may be retrieved from MFT 140. Processor 104 may utilize the information to determine the file size and a virtual cluster number (VCN) for key file 120. In an example, the VCN may identify a file state position for key file 120 within storage 106. Processor 104 may map the VCN to a logical cluster number (LCN) for key file 120 and get raw data 142 for the key file from storage 106.

In an example, processor 104 may calculate a checksum for raw data 142 for key file 120. In certain examples, processor 104 may store metadata 130 for key file 120 in NVRAM 102. In an example, metadata 130 may include, but is not limited to, a file name, LCN of the start position, an end position, and checksum for key file 120. In certain examples, NVRAM storage 102 may be a reserved memory space within a BIOS of information handling system 100 and processor 104 may access the NVRAM space via NVRAM input/output (I/O) interface.

In certain examples, an individual associated with information handling system 100 may cause processor 104 to perform a quick format, partition re-layout, or the like of storage 106. During the quick format, partition re-layout, or the like, processor 104 may clean the original MFT 140, and metadata 130 for key file 120 may be erased or lost. In this situation, the file raw data 142 may remain in clusters of storage 106. In certain examples, a majority of the raw data 142 for key file 120 may be overridden, but some of the raw data for the small key files and parts of big key files may be recovered. For example, processor 104 may utilize the metadata to recover key files when recovery tool 110 needs to use these key files for recovery of information handling system 100 after the key files were cleaned as will be described in greater detail below.

In an example, key file 120 may be an operating system (OS) recovery image file. In this example, processor 104 may utilize recovery tool 110 to access the OS recovery image file to enable an individual of information handling system 100 to recover the system. In certain examples, key file 120, such as the OS recovery image file, may be stored locally in storage 106, in a backend server 150, or in both the storage and the backend server. An amount of recovery time may differ based on the size of key file 120 and whether the key file is retrieved from storage 106 or backend server 150. For example, if the recovery image, such as key file 120, is available there in storage 106, the amount of time for recovery is reduced by download amount time to retrieve the key file from backend server 150. This difference in the recovery time, may be a significant improvement in information handling system 100.

In certain examples, processor 104 may determine the size of key file 120. Based on the size of key file 120, processor 104 may split the key file into multiple segments to increase the probability that the raw data 142 for key file 120 may be recovered if MFT 140 is erased. In an example, as the size of key file 120 increases, processor 104 may increase the number of segments that the key file is split into. For example, if key file 120 is around 8 Gigabytes, processor 104 may split the key file into around 100 segments and store the segments as raw data 142 in storage 106. If key file 120 is around 4 Gigabytes, processor 104 may split the key file into around 50 segments and store the segments as raw data 142 in storage 106. In an example, the larger number of segments, the higher probability that raw data 142 may be recovery if storage 106 is erased during a quick format, partition re-layout, or the like.

In certain examples, NVRAM storage 102 may only store a small amount of data, such that a small amount of metadata 130 may be stored in the NVRAM storage. This small amount metadata 130 may be utilized to get raw data 142 for key file 120 from storage 106. In an example, metadata 130 may also be divided into multiple segments and these individual segments may be stored in NVRAM storage 102.

During a system recovery, processor 104 may execute recovery tool 110 and attempt to utilize key file 120, such as an OS recovery image, to perform the system recovery. Prior to processor 104 utilizing raw data 142 of key file 120, such as OS recovery image, the processor may determine whether all segments of the raw data is located within storage 106. For example, processor 104 may retrieve metadata 130 for key file 120 from NVRAM storage 102 and utilize the metadata to determine an entry in MFT 140 for the key file. Processor 104 may then utilize the information in MFT 140 to determine the file size and VCN for key file 120. Based on the VCN, processor 104 may determine the LCN for key file 120 and get any raw data 142 for the key file that still remains in storage 106.

In an example, processor 104 may determine what segments, if any, of raw data 142 for key file 120 are missing or damaged. Based on the determined missing or damaged raw date 142 segments, processor 104 may download these segments of the raw data from backend server 150. Processor 104 may combine the downloaded segments with the segments of raw data 142 that remain in storage 106 to re-create the entire key file 120. In an example, processor 104 only needing to download a subset of the segments of raw data 142, such as the missing or damaged segments, may greatly reduce a download time as compared to downloading the entire large key file 120 from backend server 150. In this example, system recovery of information handling system 100 may be improved based on metadata 130 in NVRAM storage 102 and the multiple segments of raw data 142 in storage 106 for key file 120.

In a particular example, key file 120 may be a wireless fidelity (WIFI) driver for a universal serial bus (USB) key of information handling system 100. In certain examples, a recovery USB key may be created based on a service tag for a special platform of information handling system 100. However, this recovery USB key may not be used for each platform of information handling system because the WIFI driver key file 120 may be different for different platforms of the information handling system.

In an example, if raw data 142 of WIFI driver key file 120 is not stored in storage 106, cloud-based features, such as cloud reset, self-update, or the like, may not be utilized in information handling system 100. In this example, a particular WIFI driver key file 120 associated with the platform of information handling system 100 may be stored within storage 106 during the factory install process. A USB key may utilize WIFI driver key file 120 when information handling system 100 boots to WinRE. During WinRE operations, if raw data 142 for WIFI driver key file 120 is located within storage 106, the WIFI key file may be used directly. If all of raw data 142 of WIFI driver key file 120 is not located within storage 106, processor 104 may retrieve metadata 130 for the WIFI driver key file from NVRAM storage 102. Based on retrieved metadata 130, processor 140 may determine the segments of raw data 142 located within storage 106 and download the missing segments from backend server 150. In response to retrieving the missing segments from backend server 150, processor 104 may create the entire WIFI driver key file 120 so that the USB key may properly execute the cloud-based features of WinRE.

In another example, BIOS key files 120 may be utilized by BIOS UEFI of information handling system 100 to execute a BIOS recovery. In this situation, multiple segments of raw data 142 for BIOS key files 120 may be stored in storage 106 and corresponding metadata 130 for the BIOS key files may be stored in NVRAM storage 106. The BIOS UEFI may utilize metadata 130, raw data 142 and substantially similar operations described above to recover BIOS key files 120 prior to performing the BIOS recovery.

Figure 2:
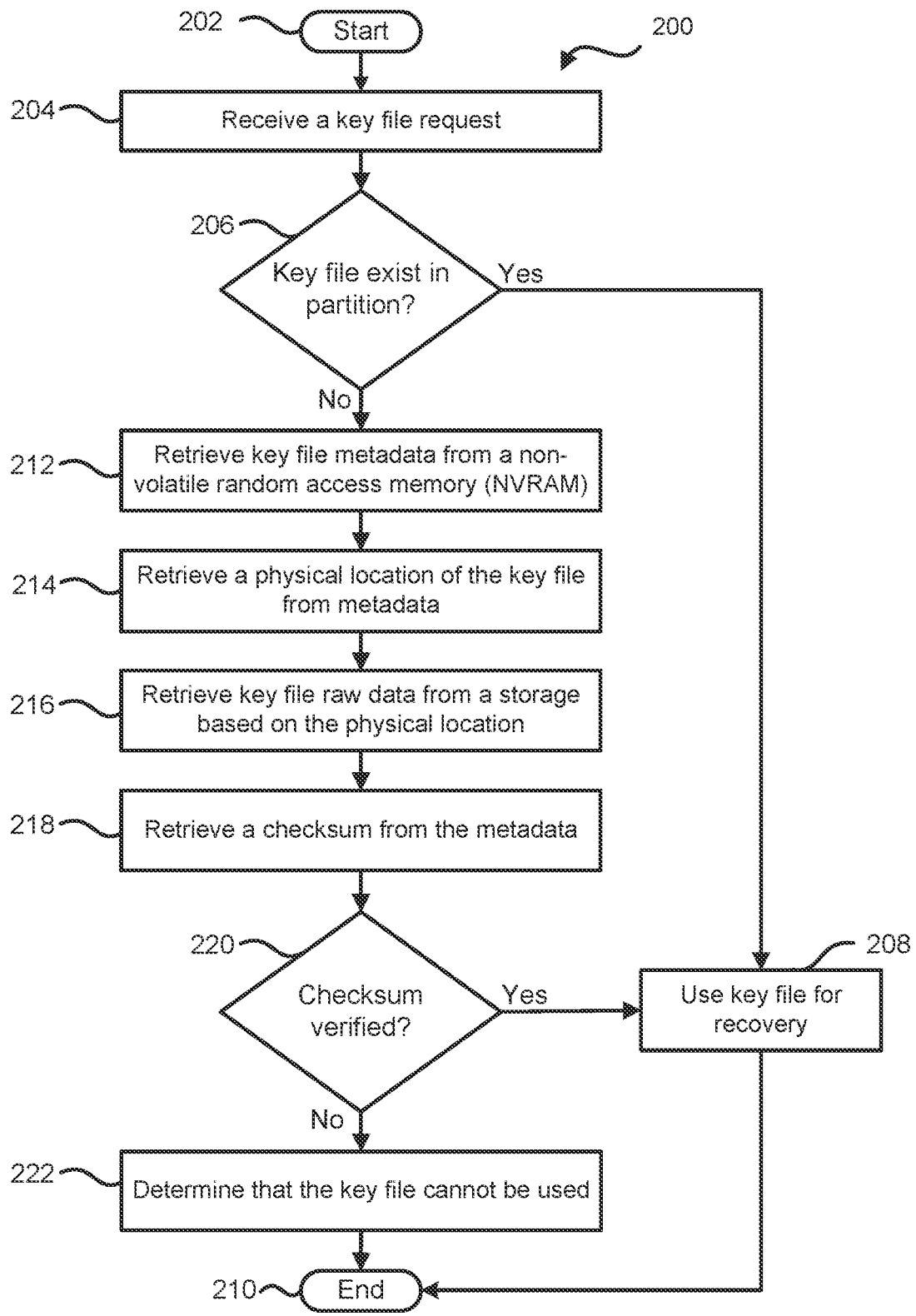
FIG. 2 is a flow diagram of a method for increasing usability of key files with an optimized file storage strategy according to at least one embodiment of the present disclosure.

FIG. 2 is a flow diagram of a method 200 for increasing usability of key files with an optimized file storage strategy according to at least one embodiment of the present disclosure, starting at block 202. In an example, method 200 may be performed by any suitable component including, but not limited to, processor 104 of FIG. 1. It will be readily appreciated that not every method step set forth in this flow diagram is always necessary, and that certain steps of the methods may be combined, performed simultaneously, in a different order, or perhaps omitted, without varying from the scope of the disclosure.

At block 204, a key file request is received. In an example, the key file request may be received in response to any suitable event in an information handling system. The event may include, but is not limited to, an OS system recovery, a BIOS recovery, and a WinRE operation. At block 206, a determination is made whether the key file exists in a partition of a storage. If the key file exists, the key file is used for recovery at block 208 and the flow ends at block 210. If the key file does not exist, key file metadata is retrieved from a NVRAM of the information handling system at block 212.

At block 214, a physical location of the key file is retrieved from the metadata. In an example, the metadata may be utilized to determine an entry in a MFT for the key file. Information in the MFT may then be utilized to determine the file size and VCN for key file. Based on the VCN, a processor may determine the LCN or physical location for the key file in a storage of an information handling system.

Based on the physical location, key file raw data is retrieved from a storage at block 216. In an example, any raw data for the key file missing from the storage may be downloaded from a backend server and the complete key file may be created based on the raw data in the storage and the raw data downloaded from the backend server. At block 218, a checksum is retrieved from the metadata. In an example, the checksum for the key file may be part of the metadata. At block 220, a determination is made whether the checksum has been verified. If the checksum is verified, the key file is used for recovery at block 208 and the flow ends at block 210. If the checksum is not verified, a determination is made that the key file cannot be used at block 222, and the flow ends at block 210.

Figure 3:
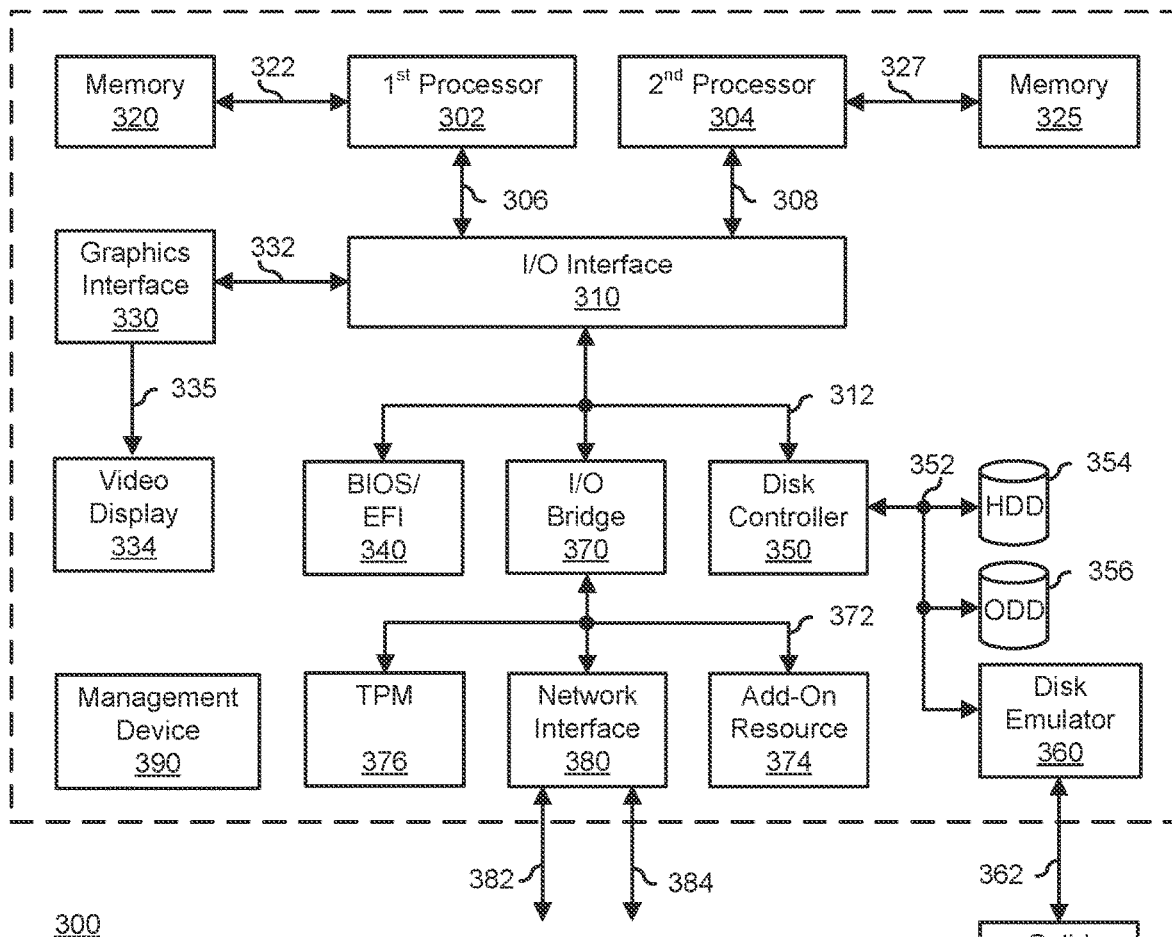
FIG. 3 is a block diagram of a general information handling system according to an embodiment of the present disclosure.

FIG. 3 shows a generalized embodiment of an information handling system 300 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below and operates to perform one or more of the methods described below. Information handling system 300 includes a processors 302 and 304, an input/output (I/O) interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 362, an I/O bridge 370, one or more add-on resources 374, a trusted platform module (TPM) 376, a network interface 380, a management device 390, and a power supply 395. Processors 302 and 304, I/O interface 310, memory 320, graphics interface 330, BIOS/UEFI module 340, disk controller 350, HDD 354, ODD 356, disk emulator 360, SSD 362, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332 and provides a video display output 336 to a video display 334. In a particular embodiment, information handling system 300 includes separate memories that are dedicated to each of processors 302 and 304 via separate memory interfaces. An example of memories 320 and 330 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 3394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312 or can be a different type of interface. As such, I/O bridge 370 extends the capacity of I/O channel 312 when peripheral interface 372 and the I/O channel are of the same type, and the I/O bridge translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300.

Management device 390 can operate off of a separate power plane from the components of the host environment so that the management device receives power to manage information handling system 300 when the information handling system is otherwise shut down. An example of management device 390 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed, or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a storage configured to store a key file in a partition of the storage; and
a processor to communicate with the storage, the processor to:
receive a request for the key file;
determine whether the key file is located within the partition of the storage;
in response to the key file not being within the partition of the storage, the processor to:
retrieve metadata for the key file;
determine a physical location for the key file based on the metadata, wherein the determining of the physical location for the key file includes:
based on the metadata, determine an entry in a master file table associated with the key file; and
based on the entry in the master file table, determine virtual cluster number for key file and a logical cluster number for the key file;
based on the physical location, retrieve one or more segments of the key file from the partition of the storage;
download one or more segments of the key file from a backend server; and
re-create the key file based on the segments of the key file retrieved from the partition of the storage and on the segments of the key file downloaded from the backend server.

2. The information handling system of claim 1, wherein the processor further to:
determine whether a checksum for the key file is verified;
in response to the checksum for the key file being verified, utilize the key file for a system recovery; and
in response to the checksum for the key file not being verified, determine that the key file cannot be utilized for the system recovery.

3. The information handling system of claim 1, wherein prior to receiving the request for the key file, the processor further to:
split the key file into multiple segments; and
store the segments in the partition of the storage.

4. The information handling system of claim 1, wherein the request for the key file is associated with a system recovery for the information handling system.

5. The information handling system of claim 1, wherein the key file is determined to not being located within the partition of the storage based on one or more segments of the key file not being located within the partition of the storage.

6. The information handling system of claim 1, wherein the metadata is stored within a non-volatile random-access memory.

7. The information handling system of claim 1, wherein in response to the key file being located within the partition of the storage, the processor further to: utilize the key file for a system recovery of the information handling system.

8. A method comprising:
receiving, by a processor, a request for a key file;
determining whether the key file is located within a partition of a storage; and
in response to the key file not being within the partition of the storage:
retrieving metadata for the key file;
determining a physical location for the key file based on the metadata, wherein the determining of the physical location for the key file includes:
based on the metadata, determining an entry in a master file table associated with the key file; and
based on the entry in the master file table, determining virtual cluster number for key file and a logical cluster number for the key file;
based on the physical location, retrieving one or more segments of the key file from the partition of the storage;
downloading one or more segments of the key file from a backend server; and
re-creating the key file based on the segments of the key file retrieved from the partition of the storage and on the segments of the key file downloaded from the backend server.

9. The method of claim 8, wherein the method further comprises:
if a checksum for the key file is verified, then utilizing the key file for a system recovery; and
if the checksum is not verified, then determining that the key file cannot be utilized for the system recovery.

10. The method of claim 8, wherein prior to receiving the request for the key file, the method further comprises:
splitting the key file into multiple segments; and
storing the segments in the partition of the storage.

11. The method of claim 8, wherein the request for the key file is associated with a system recovery for an information handling system.

12. The method of claim 8, wherein the key file is determined to not being located within the partition of the storage based on one or more segments of the key file not being located within the partition of the storage.

13. The method of claim 8, wherein the metadata is stored within a non-volatile random-access memory.

14. The method of claim 8, wherein in response to the key file being located within the partition of the storage, utilizing the key file for a system recovery of an information handling system.

15. A method comprising:
splitting a key file into multiple segments;
storing the multiple segments in a partition of a storage;
receiving, by a processor of an information handling system, a request for the key file;
if the key file is not located within the partition of the storage, then:
retrieving metadata for the key file;
determining a physical location for the key file based on the metadata, wherein the determining of the physical location for the key file includes:
based on the metadata, determining an entry in a master file table associated with the key file; and
based on the entry in the master file table, determining virtual cluster number for key file and a logical cluster number for the key file;
based on the physical location, retrieving one or more segments of the key file from the partition of the storage;
downloading one or more segments of the key file from a backend server;

re-creating the key file based on the segments of the key file retrieved from the partition of the storage and on the segments of the key file downloaded from the backend server; and if a checksum for the key file is verified, then utilizing the key file for a system recovery, otherwise determining that the key file cannot be utilized for the system recovery.

16. The method of claim 15, wherein the key file is determined to not being located within the partition of the storage based on one or more segments of the key file not being located within the partition of the storage.

17. The method of claim 15, wherein the request for the key file is associated with a system recovery for the information handling system.

18. The method of claim 15, wherein in response to the key file being located within the partition of the storage, utilizing the key file for a system recovery of the information handling system.

* * * * *